United States Patent
Becker

(10) Patent No.: US 12,380,693 B2
(45) Date of Patent: Aug. 5, 2025

(54) OBJECT DETECTION CIRCUITRY AND OBJECT DETECTION METHOD USING COMBINED PROBABILITY DATA

(71) Applicant: Sony Group Corporation, Tokyo (JP)

(72) Inventor: Florian Becker, Stuttgart (DE)

(73) Assignee: SONY GROUP CORPORATION, Tokyo (JP)

(*) Notice: Subject to any disclaimer, the term of this patent is extended or adjusted under 35 U.S.C. 154(b) by 487 days.

(21) Appl. No.: 17/635,385

(22) PCT Filed: Sep. 10, 2020

(86) PCT No.: PCT/EP2020/075417
§ 371 (c)(1),
(2) Date: Feb. 15, 2022

(87) PCT Pub. No.: WO2021/058300
PCT Pub. Date: Apr. 1, 2021

(65) Prior Publication Data
US 2022/0406044 A1    Dec. 22, 2022

(30) Foreign Application Priority Data
Sep. 25, 2019 (EP) .................................. 19199664

(51) Int. Cl.
*G06K 9/00* (2022.01)
*G06T 7/246* (2017.01)
(Continued)

(52) U.S. Cl.
CPC .............. *G06V 20/00* (2022.01); *G06T 7/246* (2017.01); *G06T 7/74* (2017.01); *G06V 10/7715* (2022.01);
(Continued)

(58) Field of Classification Search
CPC . G06T 7/246; G06T 7/74; G06T 2207/10044; G06V 10/7715
See application file for complete search history.

(56) References Cited

U.S. PATENT DOCUMENTS 9,684,836 B1    6/2017   Ferguson et al.
11,062,454 B1 *  7/2021   Cohen ..................... G01S 7/417
(Continued)

FOREIGN PATENT DOCUMENTS

JP    2017146957 A    8/2017
WO    WO-2017057056 A1    4/2017

OTHER PUBLICATIONS

Shi, J., Wang, W., Wang, X., Sun, H., Lan, X., Xin, J., & Zheng, N. (Jun. 2018). Leveraging spatio-temporal evidence and independent vision channel to improve multi-sensor fusion for vehicle environmental perception. In 2018 IEEE Intelligent Vehicles Symposium (IV) (pp. 591-596). IEEE. (Year: 2018).*

(Continued)

*Primary Examiner* — Molly Wilburn
*Assistant Examiner* — Aidan Keup
(74) *Attorney, Agent, or Firm* — XSENSUS LLP

(57) ABSTRACT

The present disclosure generally pertains to an object detection circuitry configured to: obtain first feature data which are based on first sensing data of a first sensor; compare the first feature data to a first predetermined feature model being representative of a predefined object, wherein the first predetermined feature model is specific for the first sensor, thereby generating first object probability data; obtain second feature data which are based on second sensing data of a second sensor; compare the second feature data to a second predetermined feature model being representative of the predefined object, wherein the second predetermined feature model is specific for the second sensor, thereby generating second object probability data; and combine the first and the (Continued)

second object probability data, thereby generating combined probability data for detecting the predefined object.

20 Claims, 10 Drawing Sheets

(51) Int. Cl.
    *G06T 7/73*     (2017.01)
    *G06V 10/77*     (2022.01)
    *G06V 10/776*     (2022.01)
    *G06V 10/80*     (2022.01)
    *G06V 20/00*     (2022.01)

(52) U.S. Cl.
    CPC .......... *G06V 10/776* (2022.01); *G06V 10/806* (2022.01); *G06T 2207/10028* (2013.01); *G06T 2207/10044* (2013.01); *G06T 2207/20081* (2013.01); *G06V 2201/07* (2022.01)

(56) References Cited

U.S. PATENT DOCUMENTS

| | | | |
|---|---|---|---|
| 2016/0299229 A1* | 10/2016 | Heinonen | G01S 17/86 |
| 2018/0068206 A1 | 3/2018 | Pollach et al. | |
| 2018/0365888 A1* | 12/2018 | Satzoda | G05D 1/0251 |
| 2019/0026917 A1* | 1/2019 | Liao | G06V 10/82 |
| 2019/0279000 A1* | 9/2019 | Pfeifle | G08G 1/165 |
| 2020/0280429 A1* | 9/2020 | Su | G01S 17/931 |

OTHER PUBLICATIONS

International Search Report and Written Opinion mailed on Dec. 7, 2020, received for PCT Application PCT/EP2020/075417, Filed on Sep. 10, 2020, 12 pages.
Becker, "Fusion of Data From the Object-detecting Sensors of an Autonomous Vehicle",Intelligent Transportation Systems, IEEE, Oct. 5-8, 1999, pp. 362-367.
Aeberhard, "Object-Level Fusion for Surround Environment Perception in Automated Driving Applications", PhD thesis, XP055663290, May 31, 2017, 215 pages.
Omar et al., "Multiple Sensor Fusion for Detection, Classification and Tracking of Moving Objects in Driving Environments",Thesis, XP055643862, Sep. 25, 2014, pp. 1-176.
Lee Hyungtae et al: "Dynamic belief fusion for object detection", 2016 IEEE Winter Conference on Applications of Computer Vision (WACV), IEEE, Mar. 7, 2016 (Mar. 7, 2016), pp. 1-9, XP032904263,DOI: 10.1109/WACV.2016.7477574 [retrieved on May 23, 2016].
Razinkov Evgenii et al:"ALFA: Agglomerative Late Fusion Algorithm for Object Detection", 2018 24th International Conference on Pattern Recognition (ICPR), IEEE, Aug. 20, 2018 (Aug. 20, 2018), pp. 2594-2599, XP033454012, DOI: 10.1109/ICPR.2018.8545182 [retrieved on Nov. 26, 2018].
Yong He, "A Novel Multi-source Vehicle Detection Algorithm based on Deep Learning", 2018 14th IEEE International Conference on Signal Processing (ICSP), Aug. 12, 2018, p. 979-982.
Kiyosumi Kidono, "Pedestrian Recognition Integrating High-definition LIDAR with Vision", Toyota Central R&D Labs., Inc. Toyohashi University of Technology Jun. 6, 2012, p. 207-1-207-6.

\* cited by examiner

OBJECT DETECTION CIRCUITRY AND OBJECT DETECTION METHOD USING COMBINED PROBABILITY DATA

CROSS-REFERENCE TO RELATED APPLICATIONS

The present application is based on PCT/EP2020/075417 filed on Sep. 10, 2020, and claims priority to EP 19199664.4 filed on Sep. 25, 2019, the entire contents of each are incorporated herein by reference.

TECHNICAL FIELD

The present disclosure generally pertains to an object detection circuitry and an object detection method.

TECHNICAL BACKGROUND

Generally, methods and devices for detecting an object are known. For example, in an automotive area (e.g. automotive security, autonomous driving, and the like), it is desirable to have a fast and a reliable method for detecting objects on a street.

Known ways of detecting an object (e.g. a car, a pedestrian, etc.) rely on an output result of one or multiple sensors.

For each sensor, an object detection may be performed and after that, sensor data or the data indicative of the detected object for each sensor may be fused in order to receive a final object detection.

Hence, such known ways for object detection with multiple sensors may require an object detection for each of the used sensors, which may go in hand with a high complexity in terms of processing and/or a slow or deteriorated final detection of the object after the sensor data are fused.

Although there exist techniques for detecting an object, it is generally desirable to provide an object detection circuitry and an object detection method.

SUMMARY

According to a first aspect, the disclosure provides an object detection circuitry configured to:
  obtain first feature data which are based on first sensing data of a first sensor;
  compare the first feature data to a first predetermined feature model being representative of a predefined object, wherein the first predetermined feature model is specific for the first sensor, thereby generating first object probability data;
  obtain second feature data which are based on second sensing data of a second sensor;
  compare the second feature data to a second predetermined feature model being representative of the predefined object, wherein the second predetermined feature model is specific for the second sensor, thereby generating second object probability data; and
  combine the first and the second object probability data, thereby generating combined probability data for detecting the predefined object.

According to a second aspect, the disclosure provides an object detection method comprising:
  obtaining first feature data which are based on first sensing data of a first sensor;
  comparing the first feature data to a first predetermined feature model being representative of a predefined object, wherein the first predetermined feature model is specific for the first sensor, thereby generating first object probability data;
  obtaining second feature data which are based on second sensing data of a second sensor;
  comparing the second feature data to a second predetermined feature model being representative of the predefined object, wherein the second predetermined feature model is specific for the second sensor, thereby generating second object probability data; and
  combining the first and the second object probability data, thereby generating combined probability data for detecting the predefined object.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
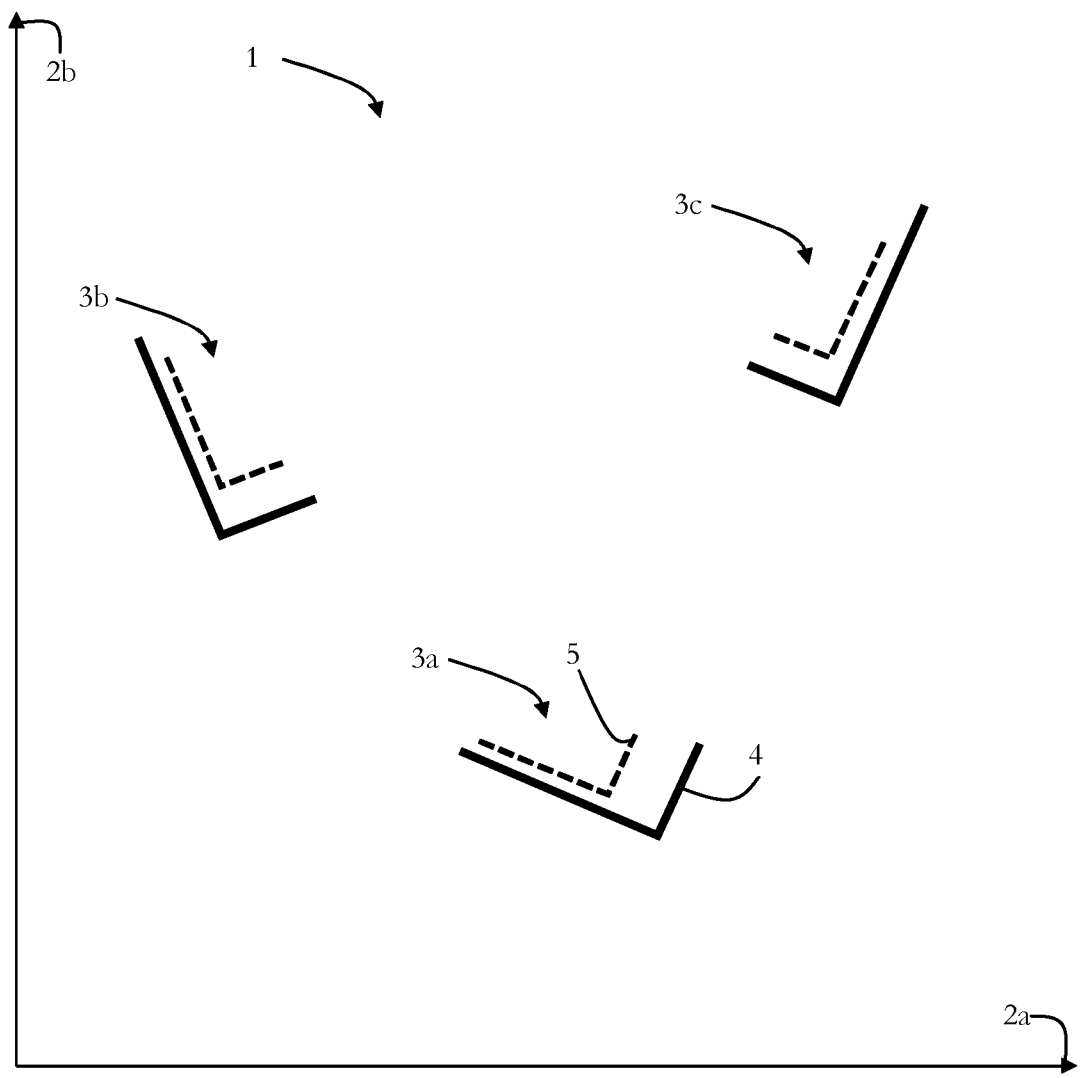
FIG. 1 depicts a coordinate system including a signal distribution acquired by a stereo camera.

Before a detailed description of the embodiments under reference of FIG. 1 is given, general explanations are made.

As mentioned in the outset, known ways of detecting an object may lead to a high processing complexity, and thereby to a high power consumption and an increase in costs.

It has been recognized that it is generally desirable to reduce a power consumption and costs.

Moreover, it has been recognized, in order to provide (semi-)autonomous driving, a full and reliable understanding of the environment may be necessary, e.g. for a planning of a route, an estimation of a danger, and the like.

Therefore, it is desirable to provide a way to use outputs of several sensors and the fusion of their measurements while at the same time providing a reliable and fast way to detect an object from a predefined list of objects.

It has further been recognized that several demands may be made to a system or a circuitry for providing such a reliable and fast way to detect an object.

One requirement may be abstraction. For example, a low-level sensor measurement (e.g. a distance) may not be suitable for planning purposes (e.g. of a route), such that information which do not contribute to an object detection may need to be filtered out and relevant information may be bundled in a representation of an environment, wherein the representation may fulfill requirements of compactness, completeness and preciseness, which may, for example, be a list of objects including parameters indicating their position. Moreover, a sensor-specific appearance of the objects must be taken into account (e.g. an object may be represented differently through a camera than through a radar).

A further requirement may be sensor fusion. Since different sensors may rely on different measurement principles and output data of each sensor may be different, as well, there may be an increased effort to operate the sensors without increasing a system complexity.

A further requirement may be a fusion of all available measurements. It has been recognized that known devices may translate low-level measurements into high-level abstract representations for each sensor and then fuse the obtained information into a joint representation. However, information, which is discarded in such an abstraction, may not be available during or after the fusion anymore, such that a quality may be reduced. Therefore, it is desirable to at least reduce an amount of a quality loss.

A further requirement may be an overcoming of a view-dependent object appearance. It has been recognized that a predefined object may vary in a sensor appearance, such that an object orientation may depend on a sensor viewing direction (i.e. a viewing angle). For example, there may be a self-occlusion effect of the object, such that a sensor may only observe a part of an object. The observed part may appear differently depending of a viewing angle of a sensor. Therefore, it is generally desirable to overcome such an effect for reliably detecting the object.

A further requirement may be in-class object invariance. Different parts of the same object may be considered to belong to different objects. For example, an object may have different shapes and/or colors at different spots, such that a different shape may be recognized as a different object. However, it is generally desirable to provide a way to detect an object as one object although there are different shapes and/or colors at the object.

A further requirement may be multi-object detection. For example, it may be necessary to detect more than one object (e.g. the closest one), such as detecting all objects, which are within a detection range.

A further requirement may be sensor noise. In order to avoid a reduction in a measurement quality, it is desirable to provide a way for compensating for (e.g. filtering) sensor noise and/or a measurement imperfection without reducing a quality.

Thus, some embodiments pertain to an object detection circuitry configured to: obtain first feature data which are based on first sensing data of a first sensor; compare the first feature data to a first predetermined feature model being representative of a predefined object, wherein the first predetermined feature model is specific for the first sensor, thereby generating first object probability data; obtain second feature data which based on second sensing data of a second sensor; compare the second feature data to a second predetermined feature model being representative of the predefined object, wherein the second predetermined feature model is specific for the second sensor, thereby generating second object probability data; and combine the first and the second object probability data, thereby generating combined probability data for detecting the predefined object.

The object detection circuitry may include one or multiple processors, such as a CPU (central processing unit), GPU (graphic processing units), one or multiple FPGAs (field programmable gate array), a computer, a server, and the like, also combinations of multiple of the named elements, and the like.

The object detection circuitry may further be included in or associated to an automotive environment, such that a detection of objects may be performed according to an operational state of, for example, a car, without limiting the present disclosure in that regard, since the object detection circuitry may be applied in any field, in which sensor data are utilized for an object detection, such as (surveillance) camera systems, and the like.

The object detection circuitry may be configured to obtain feature data, i.e. the feature data may be provided to the object detection circuitry by at least one sensor to which the object detection circuitry may be coupled, connected, associated, and the like. In some embodiments, the at least one sensor may be included in the object detection circuitry, such that the feature data may be acquired within the object detection circuitry.

In some embodiments, feature data, which are obtained by multiple sensors may be (structurally or logically) distinguished, i.e. feature data from a first sensor may be referred to as first feature data, feature data from a second sensor may be referred to as second feature data, and so on.

In some embodiments, the first feature data may be based on first sensing data. For example, the first sensor may perform a measurement according to an internal configuration; for example it may detect a reflection of a radio wave (e.g. in the case of a radar sensor), such that, for example, an analog or digital sensor output may be generated, to which it may be referred to as first sensing data.

The first feature data may include an evaluation result of the first sensing data, for example a signal intensity according to a distance in a predefined spatial resolution, such that a feature map, as it is generally known, can be generated.

In some embodiments, the first sensor may be configured to generate the first feature data, whereas in some embodiments, the first feature data are generated in the object detection circuitry.

By obtaining the feature data, a requirement of abstraction, as discussed above, may fulfilled.

Thereby, a detection list of objects including the predefined object, including a position, an orientation, and a correction estimate may be provided, such that a further pose refinement and/or a tracking of the object may be carried out.

Moreover, by obtaining feature data multiple times, a requirement of a fusion of all available measurements, as discussed above, may be fulfilled.

The object detection circuitry may be further configured to compare the first feature data to a first predefined model.

The comparison may be performed by performing a mapping between the first feature data and model feature data (e.g. comparing the generated feature map with a predefined feature map), and detecting common and/or comparable signals.

Hence, the feature model may include data indicative of a predefined feature map, which may be specific for the first sensor in a way that the first feature data may be comparable to the feature model, i.e. a radar feature model may be compared to feature data obtained based on first sensing data of a radar sensor, and the like, without limiting the present disclosure to a radar sensor. For example, also a camera (RGB, infrared, time-of-flight), a lidar sensor, a time-of-flight sensor may constitute the first sensor, or the first sensing data may be fused sensing data of multiple sensors, such as a fused signal of an RGB and a time-of-flight camera, and the like.

The feature model may be representative of a predefined object. For example, in an automotive environment, a predefined object may be a car, a pedestrian, a street sign, and the like, which may be indicated by a specific signal signature, i.e. object specific sensing data may be generated in response to a detection of the predefined object.

The object specific sensing data may be predefined, acquired in a calibration process, a training process, and the like, of the object detection circuitry, such that an assignment between the predefined object and the first feature data can be performed based on the comparison between the first feature data and the first predetermined feature model.

By performing the comparison between the first feature data and the first predetermined feature model, first object probability data may be generated, which may indicate a correspondence between the first feature data and the first predetermined feature model. In other words, it may be determined to which extent the first feature data may correspond to the predetermined object or how probable it is that the first feature data indicate the predetermined object.

A similar process may be performed to second feature data based on second sensing data of a second sensor, such that a repetitive description thereof is omitted.

However, it should be noted that, generally, the first and the second sensor may be same or different sensors, e.g. the first sensor may be a radar, the second sensor may be an RGB camera, or the like.

Moreover, the present disclosure is not limiting in that the second sensor is configured to work the same way as the first sensor. For example, in the first sensor the first feature data may be generated based on the first sensing data, whereas in the second sensor only the second sensing data may be acquired and the second feature data may be generated in the object detection circuitry, or vice versa.

The object detection circuitry may be further configured to combine the first and the second object probability data.

Thereby, a requirement of a sensor fusion, as discussed above, may be fulfilled.

The combination may be based on a multiplexing, multiplying, adding, and the like, of the first and the second object probability data, which may result in a probability value, but, in some embodiments, the combination may be based on an abstract data structure, which may be generated by an artificial intelligence, a neural network, based on a supervised or unsupervised training, and the like.

The combination procedure may be followed by a normalization of the combined probability data, as it is generally known.

The predefined object may be detected based on the combined probability data, i.e. a position in a space of the object may be determined. Moreover, a posture of the predefined object may be determined, since the first and the second feature data may be acquired for a plurality of locations with a (sensor specific) spatial resolution.

In some embodiments, the object detection circuitry is further configured to: detect a plurality of maxima of the combined probability data being indicative for at least one position parameter of the predefined object; and determine the at least one position parameter of the predefined object.

The combined probability data may represent a distribution of probabilities of features (or occurrences) of the predefined object in a space, such that a high probability (i.e. a probability above a predetermined threshold) may be a maximum and a probability below a predetermined threshold may be a minimum, such that probabilities above the predetermined threshold of the combined probability data may be taken into account for determining the at least one position parameter of the predefined object.

In some embodiments, a maximum may indicate a possibility (or a hypothesis) of an object (e.g. a single or a plurality) at a predetermined location, such that a (symbolic) position of the maximum in a probability space may indicate a (real) spatial position and orientation of the object.

In some embodiments, the detection of a plurality (i.e. at least two) of maxima may be based on known maxima detection processes, e.g. if a maximum is defined to have a Gaussian distribution (or any other distribution, such as Lorentzian, Dirac, Fermi, Poisson, etc.), a Gaussian distribution (or any other) may be detected, as it is generally known.

The plurality of maxima may be detected to be arranged in a spatial order (or pattern), such that a position parameter may be determined.

For example, in a case, in which the predefined object is a car, two maxima may be detected, which are aligned on a horizontal line of a (virtual) coordinate system, wherein the two maxima are two meters apart from each other. It may be a premise that the first sensor and the second sensor may be aligned on a horizontal axis, which may be parallel to the horizontal line.

In such a case, it may be detected that a posture of the detected car is parallel to the horizontal axis of the sensors.

Moreover, if the sensors are implemented in a car including the object detection circuitry according to the present disclosure, it may be inferred that the detected car may be perpendicular to the car including the object detection circuitry, such that, for example, a warning may be issued to a driver of the car including the object detection circuitry, or an emergency braking may be issued, and the like, without limiting the present disclosure in that regard.

On the other hand, if two maxima may be detected on a line inclined from the horizontal sensor axis, a posture and/or a positional angle of the detected car may be determined.

However, the present disclosure is not limited to the position parameter being a posture or an angle, since, in some embodiments, the at least one position parameter includes at least one of a position, a distance, an angle, and a posture.

Hence, a position may be determined and may be represented in a (virtual) coordinate system, which may also be shown to a user of the object detection circuitry on a display, and the like.

A distance may be concluded from the position, without limiting the present disclosure in that regard, as the distance may be directly determined out of the combined probability data.

The posture and/or the angle may further include a direction of the predefined object. For example, if a car is the predefined object, it may be determined where a front and/or where a back of the car is.

In some embodiments, the object detection circuitry is further configured to determine at least one of a correctness and a precision of the detection of the predefined object.

For example, a measurement may be deteriorated, e.g. by environmental influences (e.g. a temperature, a light condition, and the like), a deteriorated calibration of one (or both) of the sensors, due to a movement of the sensors (e.g. if implemented in a car) or of the predefined object (e.g. due to Doppler effect).

Therefore, a precision of the detection may be determined based on an assumed error (function), which may take into account any of the conditions mentioned above, without limiting the present disclosure in that regard.

Moreover, a correctness of the detection may be determined (e.g. based on the precision), which may indicate whether the predefined object corresponds to the detected object.

In some embodiments, the object detection circuitry is further configured to track the detected predefined object.

For example, known object tracking technologies may be applied.

However, in some embodiments the object detection circuitry may perform the same processing for the tracking again as it is applied for the detection of the predefined object, such that a tracking may correspond to a repetitive detecting of the predefined object.

In some embodiments, the object detection circuitry is further configured to: generate a first feature map based on the first sensing data; generate a second feature map based on the second sensing data; and transfer the first and the second feature map into a predefined coordinate system.

A feature map may be a map (e.g. based on the first and/or the sensing data) depicting the obtained first and second feature data, either in one map or in two maps, for example. The feature map includes, in some embodiments, the detected plurality of maxima, and may be represented by a coordinate system from a bird's eye perspective, without limiting the present disclosure in that regard.

Moreover, a feature map may be generated for different layers of a space, such that data indicating a vertical direction may be acquired.

Generally, a feature represented in the feature map may be a detected signal (or one maximum or more of the plurality of maxima), which is indicative of a specific property of the predefined object.

For example, a feature may be indicated by a detected signal stemming from a specific part of a car, e.g. a window, a back, and the like, which has a specific feature signature.

The predefined coordinate system may be a common coordinate system of the first and the second feature map or it may be different coordinate systems, which, however, may be convertible into each other, and may also be transferred into a common coordinate system.

The predefined coordinate system is not limited to a particular kind of coordinate systems as it may represent Euclidean coordinate, spherical coordinates, cylindrical coordinates, polar coordinates, and the like, and the origin of the predefined coordinate system may, for example be a particular location of one of the two sensors, a detected object, or any other location in a space.

In some embodiments, the first and the second sensor include at least one of a radar sensor, a lidar sensor, a camera, or a time-of-flight sensor, as discussed herein.

In some embodiments, at least one of the first predetermined feature model and the second predetermined feature model is based on a supervised training of an artificial intelligence.

The artificial intelligence (AI) may use machine learning based methods or explicit feature based methods, such as shape matching, for example by edge detection, histogram based methods, template match based methods, color match based methods, or the like. In some embodiments, a machine learning algorithm may be used for performing object recognition, e.g. for comparing a detected predefined object with a recognized object to increase a correctness of a detection, which may be based on at least one of: Scale Invariant Feature Transfer (SIFT), Gray Level Co-occurrence Matrix (GLCM), Gabor Features, Tubeness, or the like. Moreover, the machine learning algorithm may be based on a classifier technique, wherein such a machine learning algorithm may be based on least one of: Random Forest; Support Vector Machine; Neural Net, Bayes Net, or the like. Furthermore, the machine learning algorithm may apply deep-learning techniques, wherein such deep-learning techniques may be based on at least one of: Autoencoders, Generative Adversarial Network, weakly supervised learning, boot-strapping, or the like.

The supervised learning may further be based on a regression algorithm, a perceptron algorithm, Bayes-classification, Naiver Bayer classification, next-neighbor classification, artificial neural network, and the like.

The artificial intelligence may, in such embodiments, be fed with ground truth data, which may correspond to or be based on the predefined object, such that the artificial intelligence may learn to assign the first and/or the second feature data to the ground truth data, thereby developing or generating the first and/or the second feature model.

In some embodiments, the predefined object is based on a class of predefined objects.

As discussed above, the disclosure may pertain to an object detection in an automotive field, such that a class of predefined objects may, in such embodiments, include a car, a passenger, a road sign, a street, a house, a tree, an animal, a traffic light, and the like.

However, in other embodiments, the object detection circuitry may be applied to a surveillance system, for example of a warehouse, or the like, such that the class of predefined objects may include a customer, an employee, a shelf, a product, and the like, without limiting the present disclosure to embodiments pertaining to automotive or surveillance applications. Generally, the present disclosure may be applied in any field, in which an object detection may be performed.

In some embodiments, the object detection circuitry is further configured to: iteratively convolve the first feature data with the first predetermined feature model, thereby generating the first object probability data; iteratively convolve the second feature data with the second predetermined feature model, thereby generating the second object probability data; and iteratively convolve the first and the second object probability data, thereby generating the combined object probability data.

For example, a plurality of first feature data may be acquired (e.g. for different heights or layers, for different angles, and the like), which may each be convolved (e.g. compared, as discussed above) with the first predetermined feature model in a consecutive ordering (i.e. iteratively), to which it may in this disclosure be referred to as vertical iteration. Moreover, a plurality of second feature data may be acquired, which may each be convolved with the second predetermined feature model in a consecutive ordering, as well in a vertical iteration.

Moreover, first generated first object probability data (e.g. from a first measurement of the first sensor) may be convolved with the first generated second object probability data (e.g. by summing up the respective probabilities), to which it may be referred to as horizontal iteration, whereby the combined probability data are generated.

Some embodiments pertain to an object detection method including: obtaining first feature data which are based on first sensing data of a first sensor; comparing the first feature data to a first predetermined feature model being representative of a predefined object, wherein the first predetermined feature model is specific for the first sensor, thereby generating first object probability data; obtaining second feature data which based on second sensing data of a second sensor; comparing the second feature data to a second predetermined feature model being representative of the predefined object, wherein the second predetermined feature model is specific for the second sensor, thereby generating second object probability data; and combining the first and the second object probability data, thereby generating combined probability data for detecting the predefined object, as discussed herein.

The object detection method may be performed with an object detection circuitry according to the present disclosure, and the like, such as a processor (or multiple processors) configured to perform the object detection method.

In some embodiments, the method further includes: detecting a plurality of maxima of the combined probability data being indicative for at least one position parameter of the predefined object; and determining the at least one position parameter of the predefined object, as discussed herein. In some embodiments, the at least one position parameter includes at least one of a position, a distance, an angle, and a posture, as discussed herein. In some embodiments, the method further includes: determining at least one of a correctness and a precision of the detection of the predefined object, as discussed herein. In some embodiment, the method further includes tracking the detected predefined object, as discussed herein. In some embodiments, the method further includes: generating a first feature map based on the first sensing data; generating a second feature map based on the second sensing data; and transferring the first and the second feature map into a predefined coordinate system, as discussed herein. In some embodiments, the first and the second sensor include at least one of a radar sensor, a lidar sensor, a camera, or a time-of-flight sensor, as discussed herein. In some embodiments, at least one of the first predetermined feature model and the second predetermined feature model is based on a supervised training of an artificial intelligence, as discussed herein. In some embodiments, the predefined object is based on a class of predefined objects, as discussed herein. In some embodiments, the method further includes: iteratively convolving the first feature data with the first predetermined feature model, thereby generating the first object probability data; iteratively convolving the second feature data with the second predetermined feature model, thereby generating the second object probability data; and iteratively convolving the first and the second convolved feature data, thereby generating the combined probability data, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Generally, each sensor (i.e. the first and the second sensor, but not limited to two sensors) may provide a (predetermined) number of measurements M, wherein in response to each measurement f a feature may be assigned to two coordinates $l_x$ and $l_z$ (or short $l=l_x, l_z$)) of a two-dimensional coordinate system, such that a feature map (or a plurality of feature maps, each measurement being indicative of a feature map), as discussed herein, may be generated.

Each feature map may have a number of i grid cells, wherein the grid cells may have an identical or a different size and each grid cell may include two values representing the number of measurements detecting a particular feature n, which may be displayed as a function, such as $n(f=1|l, i)$ and a number of measurements not detecting the particular feature, i.e. $n(f=0|l, i)$.

Based on all or a subset of the obtained feature maps, a probability $p(O(c, \theta)=1|f_1, \ldots, f_M)$ of an existence of an object in an object parameter space may be determined, wherein O may be the object, c may correspond to coordinates $(c_x, c_z)$ of the object, $\theta$ may be indicative of the posture of the object (i.e. an angle), $(c, \theta)$ being the (three-dimensional) parameter space.

In particular, $c_x$ may include a center of the object in an x-direction, $c_z$ may include the center of the object in a z-direction and $\theta$ may include an orientation of the object in an x-z-plane, which may be limited to an interval of values, such as $[0, 2\pi)$.

Thereby, a requirement of overcoming a view-dependent object appearance, as discussed above, may be fulfilled.

The probability p may be determined according to the following formula:

$$p(O(c, \theta) = 1 \mid f_1, \ldots, f_M) = \prod_{i=1}^{M} \prod_l p(O(c, \theta) = 1 \mid f_i(l) = 1)^{n(f=1|l,i)} p(O(c, \theta) = 1 \mid f_i(l) = 0)^{n(f=0|l,i)}$$

In some embodiments, a discretized representation of the parameter space is generated, which may be represented by a three-dimensional array including a number of discretization points along the x-axis times a number of discretization points along the z-axis times a number of discretization points along an orientation axis (i.e. the angle).

Moreover, in some embodiments, a logarithmic value of $p(O(c, \theta)=1|f_1, \ldots, f_M)$ may be computed, which may reduce a number of inference steps to a number of convolutions.

In some embodiments, the terms $p(O(c, \theta)=1|f_i(l)=1)$ and $p(O(c, \theta)=1|f_i(l)=0)$ are implemented shift-invariant in l, such that $p(O(c, \theta)=1|f_i(l)=1)=p(O(c-l, \theta)=1|f_i(0)=1)$ and $p(O(c, \theta)=1|f_i(l)=0)=p(O(c-l, \theta)=1|f_i(0)=0)$.

Thereby, a requirement of an in-class object invariance, as discussed above, may be fulfilled.

Hence, in such embodiments the terms may be indicative of the object being located at a position with an orientation $(c-l; \theta)$, if a feature is detected at l (i.e. f=1) or not detected at l (i.e. f=0), respectively.

In some embodiments, the terms $p(O(c-l, \theta)=1|f_i(0)=1)$ and $p(O(c-l, \theta)=1|f_i(0)=0)$ are determined based on a supervised training from a real or simulated sensor measurement, which, in some embodiments may be noisy, of a predetermined number of predetermined objects with predetermined postures.

Thereby, sensor noise may be recognized and/or filtered out, such that a requirement of sensor noise, as discussed above, may be fulfilled.

In some embodiments, local maxima, i.e. $p(O(c-l, \theta)=1|f_i(0)=1)$ are located in the parameter space while excluding other parameters based on a non-maximum suppression.

In some embodiments, a location $(c, \theta)$ of a local maximum may indicate a pose (e.g. a position and an orientation) of the predetermined object (or multiple predetermined objects), wherein a correctness of the determined pose may be determined by evaluating $p(O(c, \theta)=1|f_1, \ldots, f_M)$ at the location of the local maximum, wherein a correctness may be given, if $p(O(c, \theta)=1|f_1, \ldots, f_M)$ is above a predetermined threshold.

Thereby, a requirement of multi-object detection, as discussed above, may be fulfilled by providing a list of detection, wherein the precision of the pose may depend on a resolution of the pose space $(c, \theta)$.

In some embodiments, a precision of the determined pose may be determined by evaluating a curvature of $p(O(c, \theta)=1|f_1, \ldots, f_M)$ at the location of the local maximum, wherein a higher precision may correspond to a higher value of the curvature (in other embodiments, a higher precision may correspond to a lower value of the curvature).

A detection of the pose (or posture) may be refined in a consecutive measurement based on the correctness and/or the precision of the measurement.

Returning to FIG. 1, there is depicted a first coordinate system 1 including two axes 2a and 2b each indicating positional coordinates.

Moreover, three signal distributions 3a, 3b and 3c (first feature data) are shown, which are obtained based on first sensing data by a stereo camera as a first sensor. Only the signal distribution 3a is discussed herein, in order to omit a repetitive discussion.

The signal distribution 3a has a first sub-signal 4 and a second sub-signal 5, wherein the first sub-signal 4 has a stronger signal intensity than the second sub-signal 5.

Figure 2:
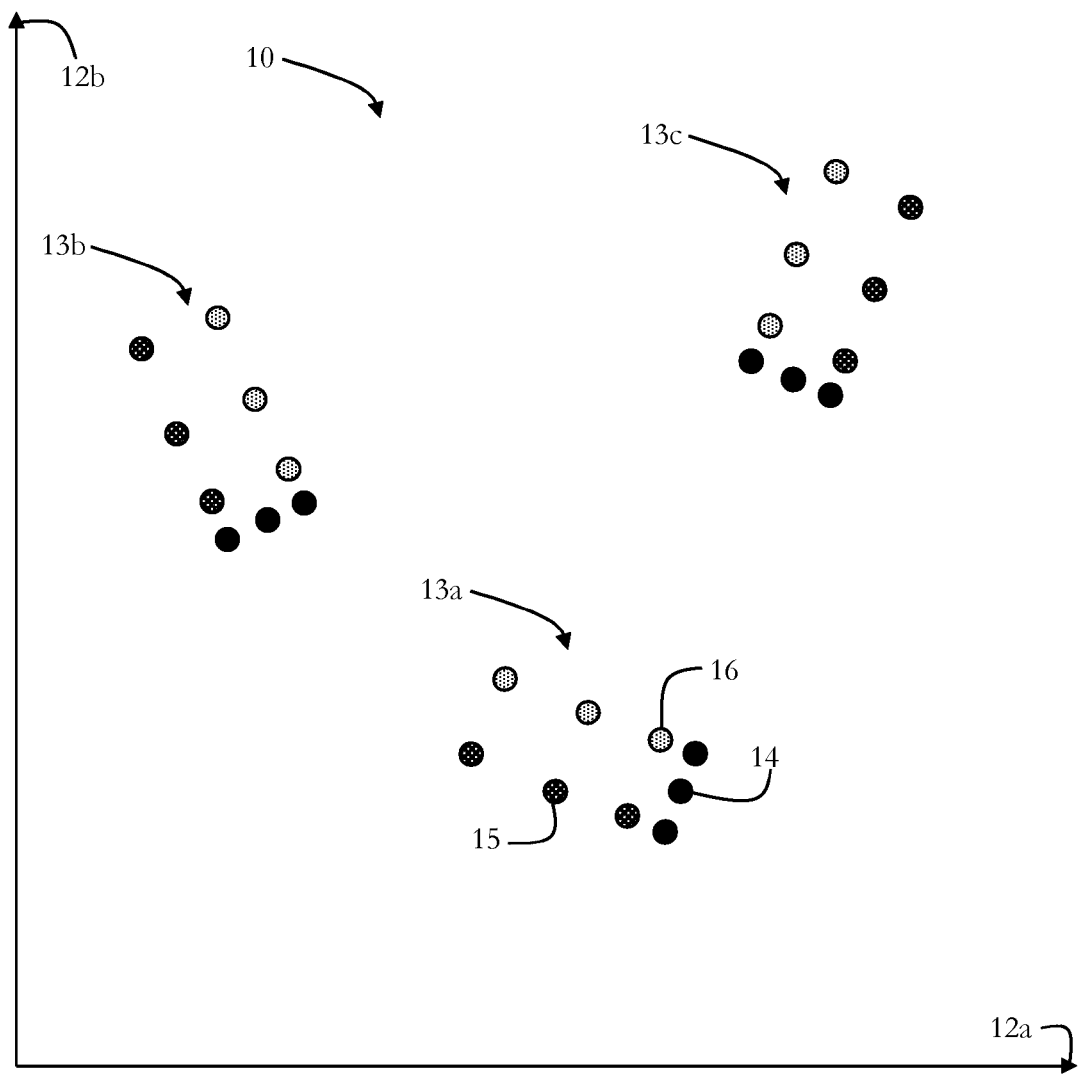
FIG. 2 depicts a coordinate system including a signal distribution acquired by a radar sensor.

FIG. 2 depicts a second coordinate system 10 including two axes 12a and 12b, which correspond to the axes 2a and 2b FIG. 1.

Moreover three signal distributions 13a, 13b and 13c (second feature data) are shown, which are obtained based on second sensing data by a radar sensor as a second sensor.

The signal distribution 13a (and correspondingly 13b and 13c although not explicitly discussed again) includes first sub-signals 14, second sub-signals 15, and third sub-signals 16, which are, for illustrative reasons, grouped by different patterns, wherein the pattern strength corresponds to the respective signal strength, i.e. the first sub-signals 14 have the strongest signal intensity of the first to third sub-signals 14 to 16, the second sub-signals 15 have the second strongest signal intensity of the first to third sub-signals 14 to 16, and the third sub-signals 16 have the third strongest signal intensity of the first to third sub-signals 14 to 16.

In the currently described embodiment, the signal distributions 3a, 3b, 3c, 13a, 13b, and 13c described with respect to FIGS. 1 and 2 are obtained by acquiring first and second sensing data of three cars as predefined objects, i.e. the signal distributions 3a to 3c and 13a to 13c are indicative of cars.

Figure 3:
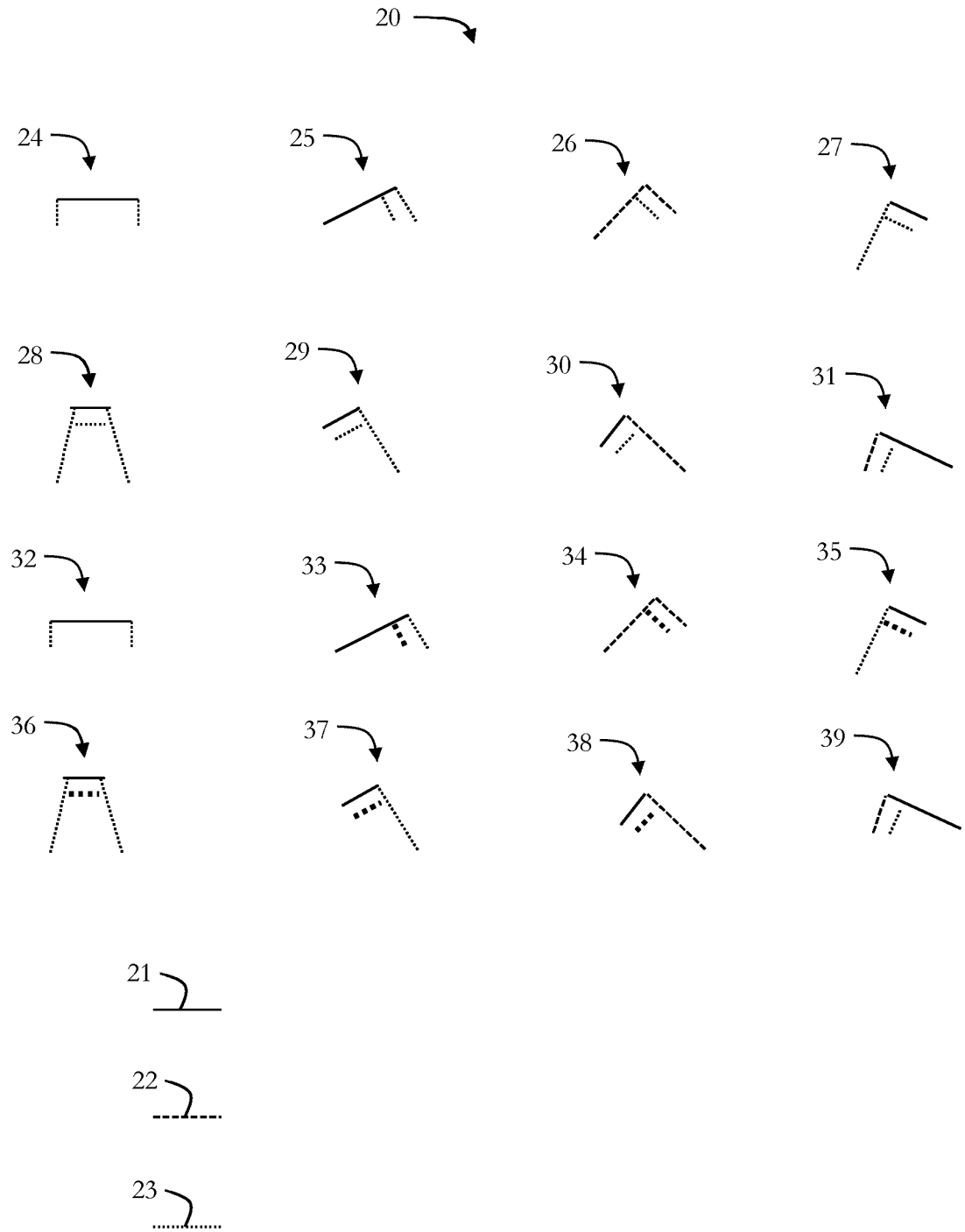
FIG. 3 depicts a template (feature model) for a stereo camera.

FIG. 3 depicts a template (i.e. a feature model) 20 for a stereo camera as a sensor, which is based on a supervised training of an artificial intelligence.

The template 20 represents different postures of cars 24 to 39, wherein each posture is assigned to a probability, as discussed herein.

Moreover, different intensities of the signals are symbolically depicted with different lines 21 to 23, wherein the line 21 represents a strongest intensity, the line 22 the second strongest, and the line 23 the weakest detected intensity, without limiting the present disclosure in that regard, since, as it is generally known, a continuous distribution of intensities may be detected, as well.

The assignment is displayed in the following table, wherein each reference sign (corresponding to a posture as depicted) is assigned to a probability and the posture is represented by an angle $\theta$.

| Reference sign | Probability | Angle (rad) |
|---|---|---|
| 24 | $p(O(c-1, \theta = 0) = 1 \mid f_i(0) = 1)$ | 0 |
| 25 | $p(O(c-1, \theta = 0.393) = 1 \mid f_i(0) = 1)$ | 0.393 |
| 26 | $p(O(c-1, \theta = 0.785) = 1 \mid f_i(0) = 1)$ | 0.785 |
| 27 | $p(O(c-1, \theta = 1.178) = 1 \mid f_i(0) = 1)$ | 1.178 |
| 28 | $p(O(c-1, \theta = 1.571) = 1 \mid f_i(0) = 1)$ | 1.571 |
| 29 | $p(O(c-1, \theta = 1.963) = 1 \mid f_i(0) = 1)$ | 1.963 |
| 30 | $p(O(c-1, \theta = 2.356) = 1 \mid f_i(0) = 1)$ | 2.356 |
| 31 | $p(O(c-1, \theta = 2.749) = 1 \mid f_i(0) = 1)$ | 2.749 |
| 32 | $p(O(c-1, \theta = 3.142) = 1 \mid f_i(0) = 1)$ | 3.142 |
| 33 | $p(O(c-1, \theta = 3.534) = 1 \mid f_i(0) = 1)$ | 3.534 |
| 34 | $p(O(c-1, \theta = 3.927) = 1 \mid f_i(0) = 1)$ | 3.927 |
| 35 | $p(O(c-1, \theta = 4.320) = 1 \mid f_i(0) = 1)$ | 4.320 |
| 36 | $p(O(c-1, \theta = 4.712) = 1 \mid f_i(0) = 1)$ | 4.712 |
| 37 | $p(O(c-1, \theta = 5.105) = 1 \mid f_i(0) = 1)$ | 5.105 |
| 38 | $p(O(c-1, \theta = 5.498) = 1 \mid f_i(0) = 1)$ | 5.498 |
| 39 | $p(O(c-1, \theta = 5.890) = 1 \mid f_i(0) = 1)$ | 5.890 |

Figure 4:
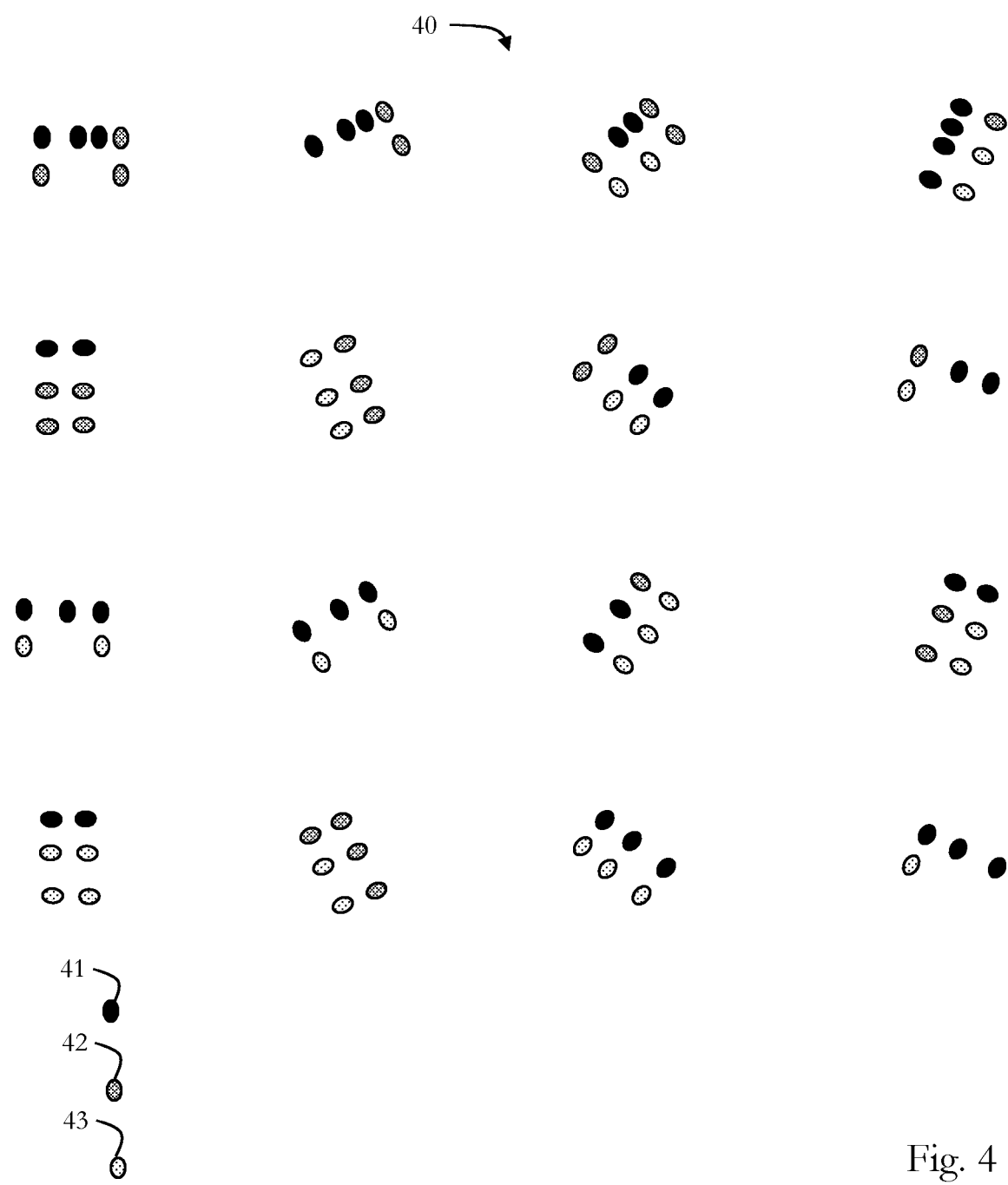
FIG. 4 depicts a template (feature model) for a radar sensor.

FIG. 4 depicts a template (i.e. a feature model) 40 for a radar as a sensor, which is based on a supervised training of an artificial intelligence.

The template 40 represents different postures of cars, which correspond to the ordering (in terms of probability and angle) of the template 20 of FIG. 3, and, therefore, a repetitive description (together with reference signs) is omitted.

Different intensities of the signals are symbolically depicted with differently hatched ellipses 41 to 43, wherein the ellipse 41 represents a strongest intensity, the ellipse 42 the second strongest, and the ellipse 43 the weakest detected intensity, without limiting the present disclosure in that regard, since, as it is generally known, a continuous distribution of intensities may be detected, as well.

The logarithmic probabilities of object poses is determined using templates 20 and 40, as discussed herein, and the object pose probability distributions are fused, such that a fused pose probability distribution (or a fused feature model) is generated.

Figure 5:
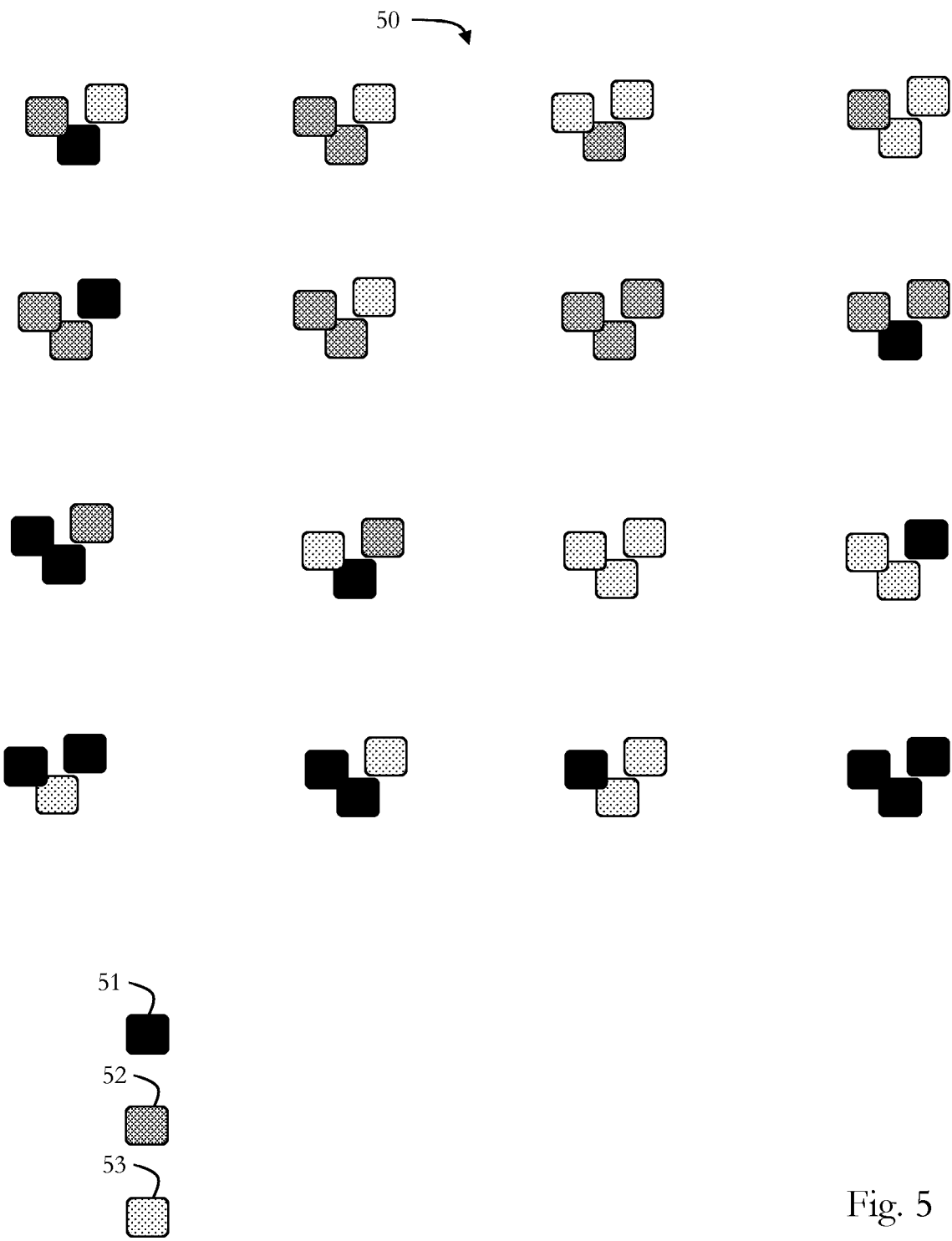
FIG. 5 depicts a fused object pose probability distribution.

FIG. 5 depicts such a fused pose probability distribution 50 with the same ordering of postures of the car as in FIGS. 3 and 4, such that a repetitive description (together with reference signs) is omitted.

Different intensities of the signals are symbolically depicted with differently hatched rectangles 51 to 53, wherein the rectangle 51 represents a strongest intensity, the rectangle 52 the second strongest, and the rectangle 53 the weakest detected intensity, without limiting the present disclosure in that regard, since, as it is generally known, a continuous distribution of intensities may be detected, as well.

The logarithmic probability of the first and the second feature data (of in FIGS. 1 and 2) are fused into a combined pose probability distribution 50 for each of the three objects (cars) of FIGS. 1 and 2, such that poses of the three cars.

Figure 6:
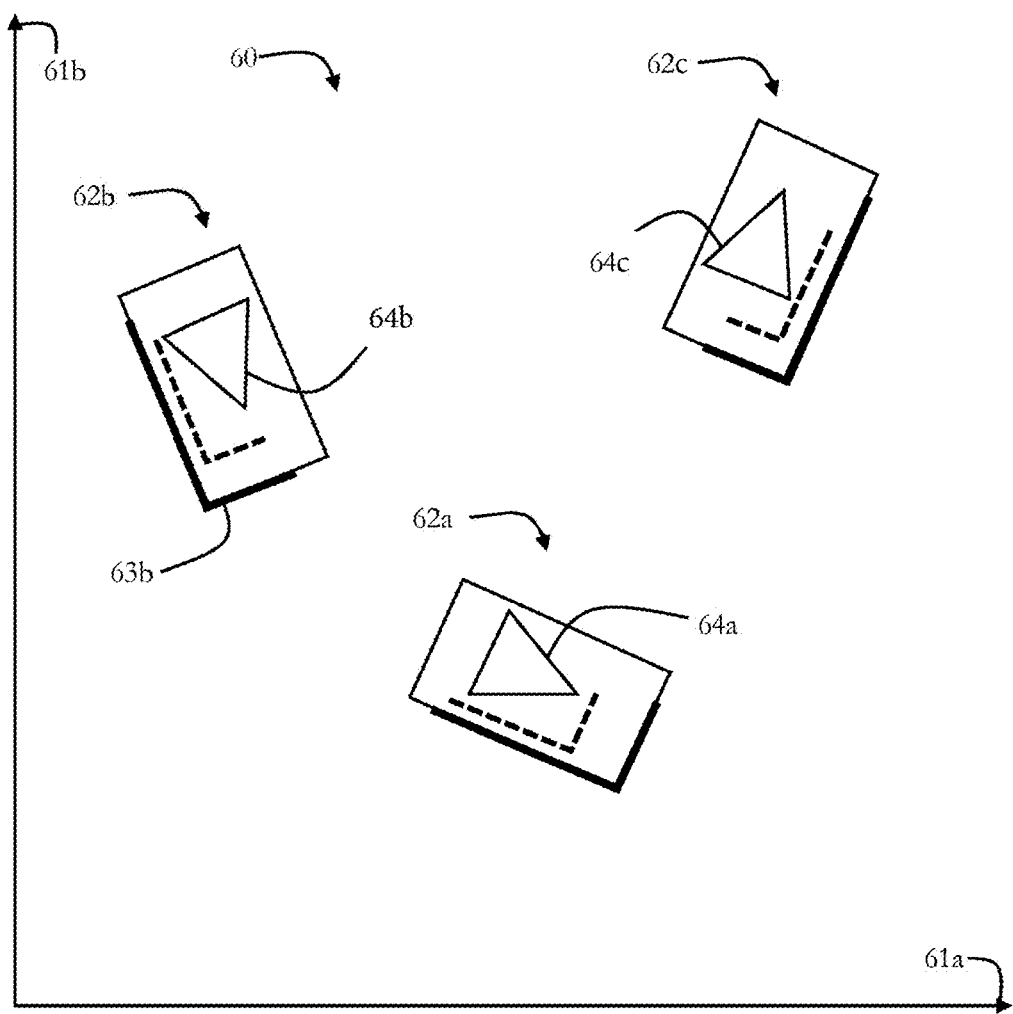
FIG. 6 depicts a coordinate system including detected objects based on feature maps of the stereo camera and the radar sensor.

A result of the comparison is displayed in FIG. 6

FIG. 6 depicts a coordinate system 60 including two axes 61a and 61b each indicating positional coordinates.

Moreover, three detected objects 62a, 62b and 62c are shown, overlaid with summed up features 63 of the feature maps 1 and 10 of FIGS. 1 and 2, respectively. The display of the three detected objects further include pointers 64a, 64b, and 64c indicating a posture of each detected object 62a, 62b, and 62c, respectively.

Figure 7:
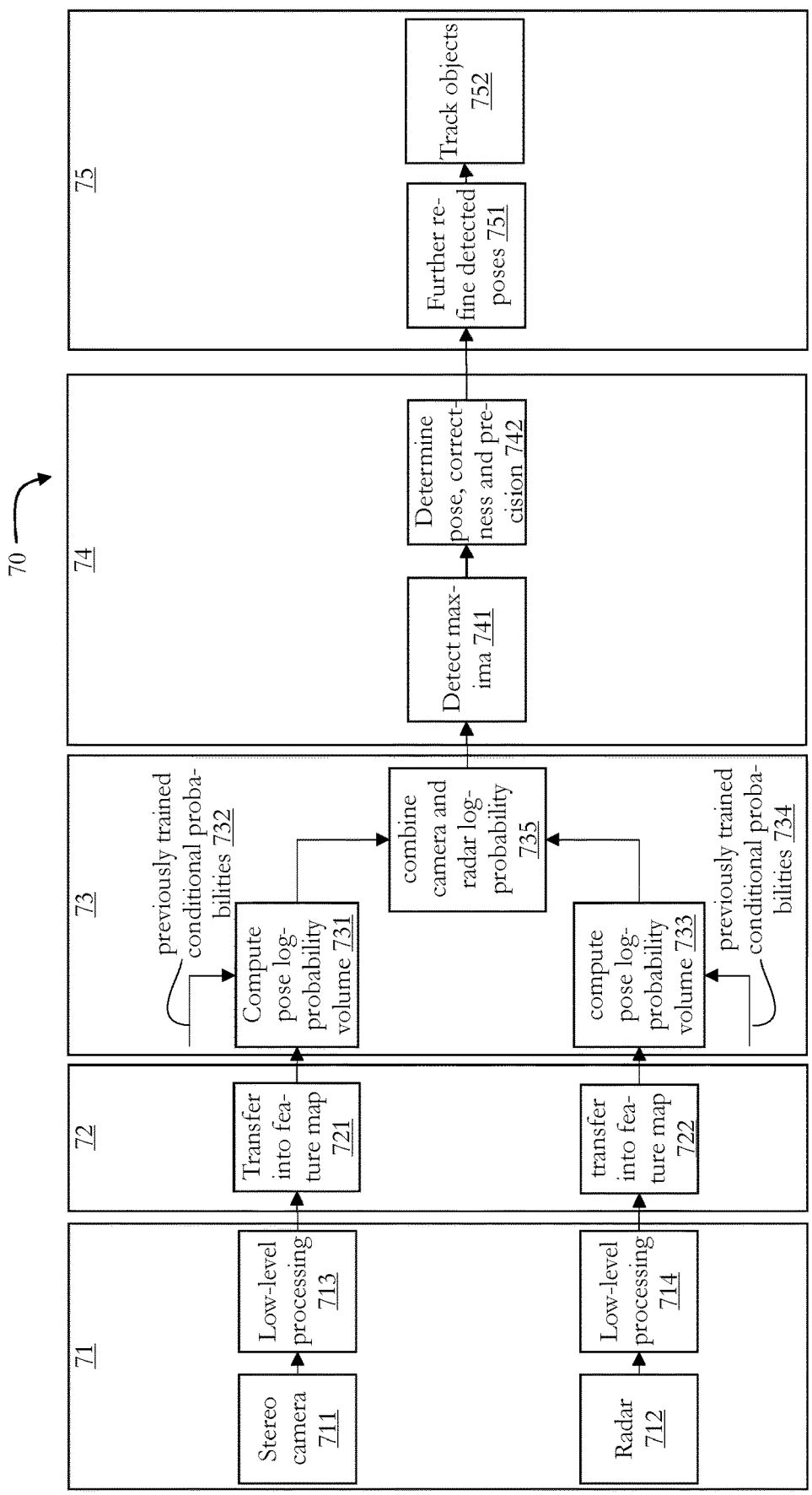
FIG. 7 depicts a block diagram of a method according to the present disclosure.

FIG. 7 depicts a block diagram of a method 70 according to the present disclosure.

In 71, a sensor measurement is performed. In this embodiment, a stereo camera image pair as first sensing raw data is acquired in 711 and radar data as second sensing raw data is acquired in 712.

With each of the sensing raw data, a low level processing is performed.

In the case of the stereo camera image pair, a calibration and a disparity estimation is performed in 713. In the case of the radar data, a calibration and a Fast Fourier Transformation is performed in 714.

In 72, the low-level processed first and second sensing raw data are transferred into respective feature maps, such that the low-level processed first sensing raw data are transferred into a feature map in bird's eye view in 721, and the low-level processed second sensing raw data are transferred into a feature map in bird's eye view of 722.

In 73, a logarithmic probability, as discussed herein, is determined from the feature maps.

In particular, in 731, a pose logarithmic probability volume of the stereo camera feature map is determined based on previously trained conditional probabilities, which are being fed to the determination of the pose logarithmic probability volume in 732.

Moreover, in 733, a pose logarithmic probability volume of the radar sensor is determined based on previously trained conditional probabilities, which are being fed to the determination of the pose logarithmic probability volume in 734.

The determined pose logarithmic probability volumes are combined (or fused) in 735, as discussed herein.

In 74, local maxima are determined and processed, as discussed herein.

Based on the combined probability, maxima are detected with a non-maxima suppression algorithm in 741, as discussed herein.

In 742, a pose, correctness and a precision is determined based on the detected maxima, as discussed herein.

In 75, further processing is performed based on the determined poses (i.e. position and orientation), correctness, and precision, as discussed herein.

In particular, a further refinement of the detected poses is performed in 751, such that the detected object (or detected objects) is tracked in 752, as discussed herein.

Figure 8:
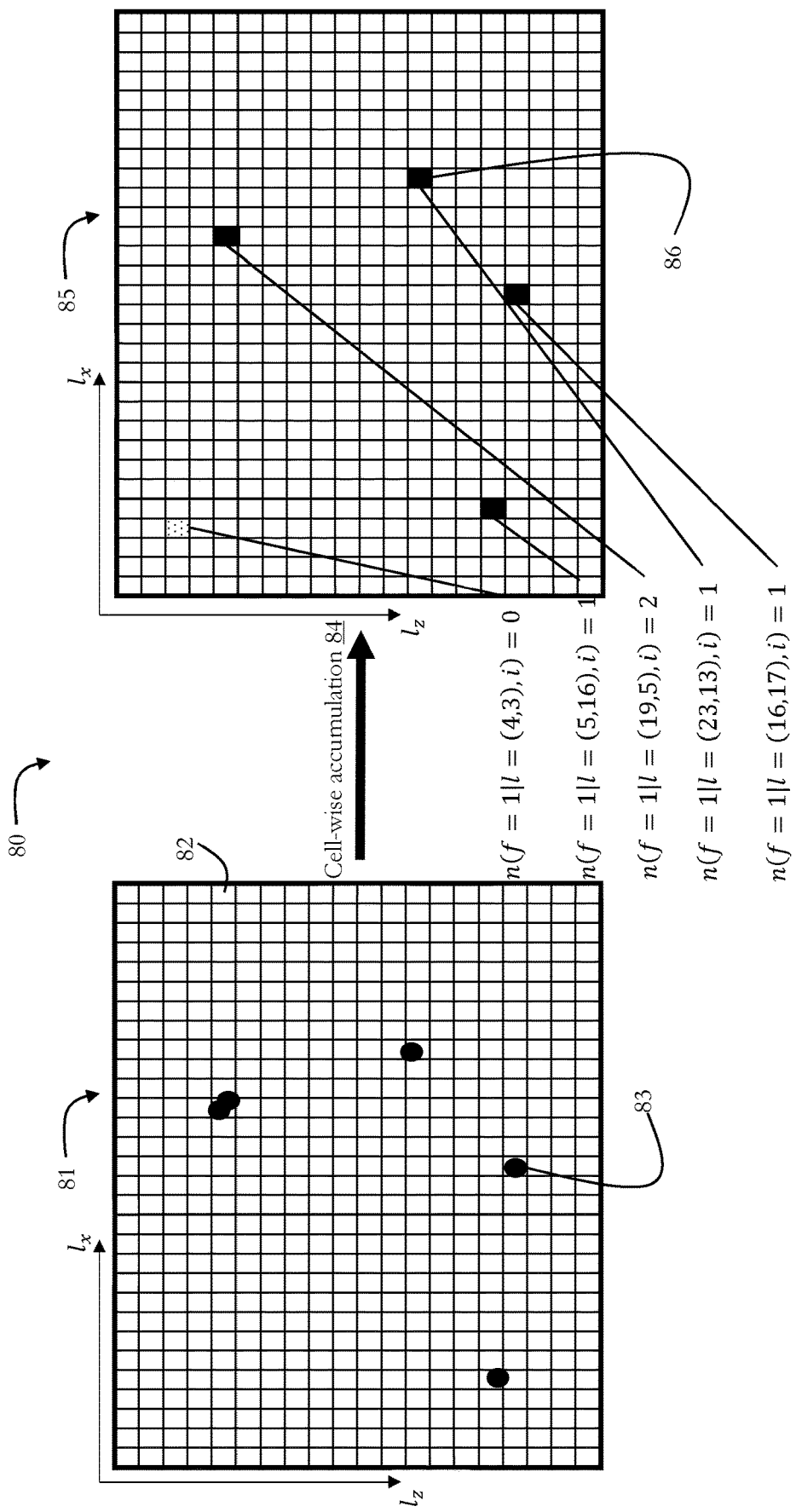
FIG. 8 schematically illustrates a method for generating a feature map according to the present disclosure.

FIG. 8 schematically illustrates a method 80 for generating a feature map.

A coordinate system 81 including a plurality of cells 82 being defined by coordinates $l_x$ and $L_z$ (or $(l_x, l_z)$) is depicted.

Moreover, the coordinate system 81 includes a plurality of detections 83, which are overlapping with borders of the cells 82, without limiting the present disclosure in that regard, since a detection 83 may generally be fully inside a cell 82.

The detections 83 are assigned to one of the cells 82, in which most of the detection signal lies, i.e. a cell-wise accumulation of the detections 83 is performed in 84.

A coordinate system 85 is depicted, which basically corresponds to the coordinate system 81, such that a repetitive description is omitted.

However, the coordinate system 85 is different from the coordinate system 81 in that the detections 83 are accumulated to features 86.

For each cell corresponding to a specific coordinate, a number of detections is determined, such that an empty cell, for example the cell (4, 3) can be described as $n(f=1|l=((4, 3), i)=0$, a cell with one detection or feature, for example the cells (5, 16), (23, 13), and (17, 16) can be described as $n(f=1|l=((5, 16), i)=1$, $n(f=1|l=((23, 13), i)=1$, and $n(f=1|l=((16, 17), i)=1$, respectively, and a cell with two detections or features, for example the cell (19, 5) can be described as $n(f=1|l=((19, 5), i)=2$, without limiting the present disclosure to a maximum number of to detections in one cell.

Figure 9:
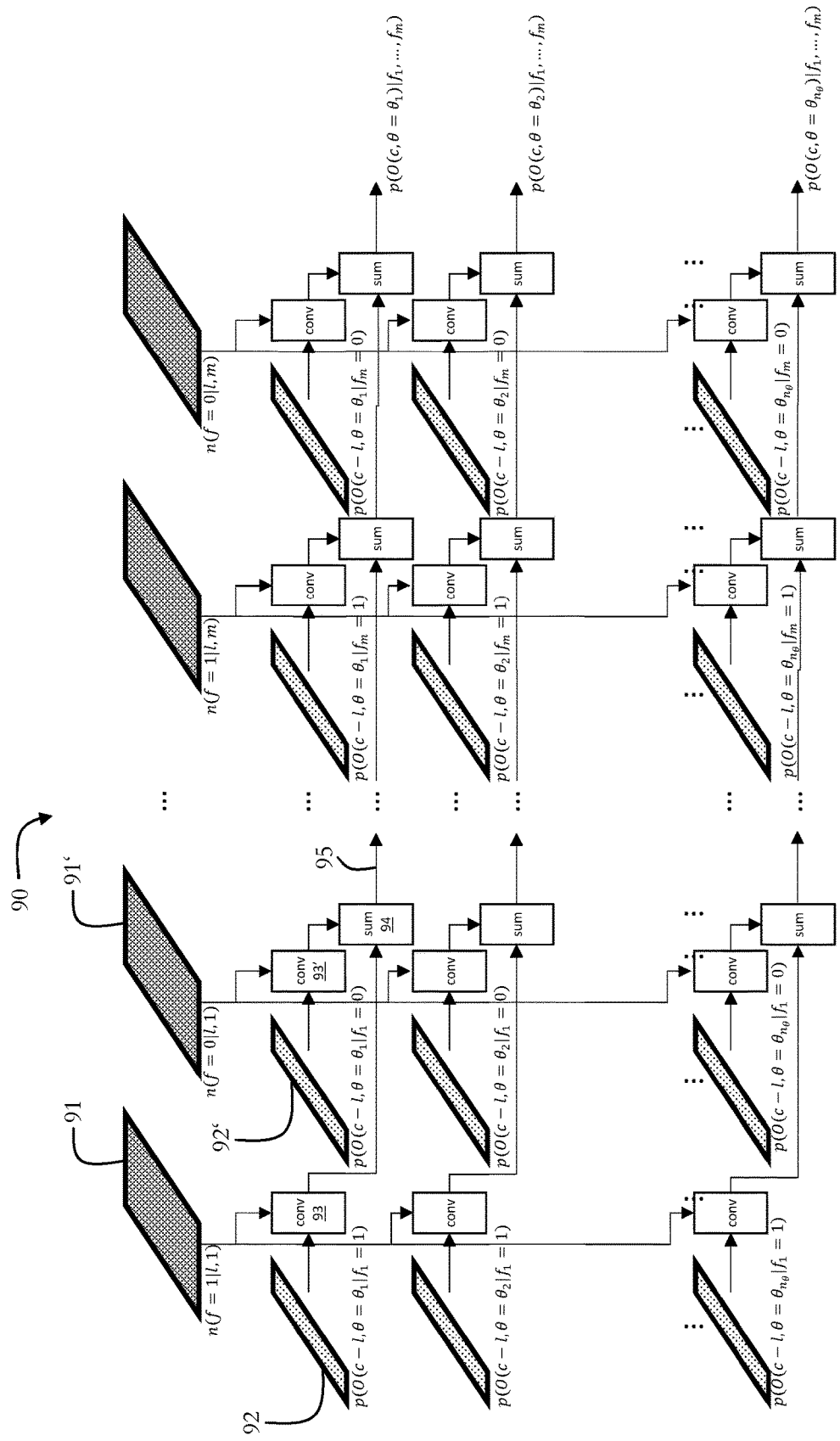
FIG. 9 schematically illustrates a method for determining object probability data according to the present disclosure.

FIG. 9 schematically illustrates a method 90 for determining object probability data according to the present disclosure.

The following description of the method 90 only takes into account a measurement of two sensors 91 and 91'. However, as the skilled person may take from FIG. 9, the disclosure is not limited to two sensors, as it may be envisaged for an arbitrary number of sensors with an arbitrary number of measurements.

First feature data, which are based on a sensor measurement of a sensor 91 are convolved with a predetermined feature model 92 (i.e. a predetermined conditional probability based on a supervised training being specific for the sensor 91) in 93.

Second feature data, which are based on a sensor measurement of a sensor 91' are convolved with a predetermined feature model 92' (i.e. a predetermined conditional probability based on a supervised training being specific for the sensor 91') in 93'.

Moreover, a sum 94 of the convolved data of 93 and the convolved data of 93' is determined, which serves as a basis for a further convolution with further sensing data for detecting an object, or, in some embodiments, as a basis for detecting the object.

Figure 10:
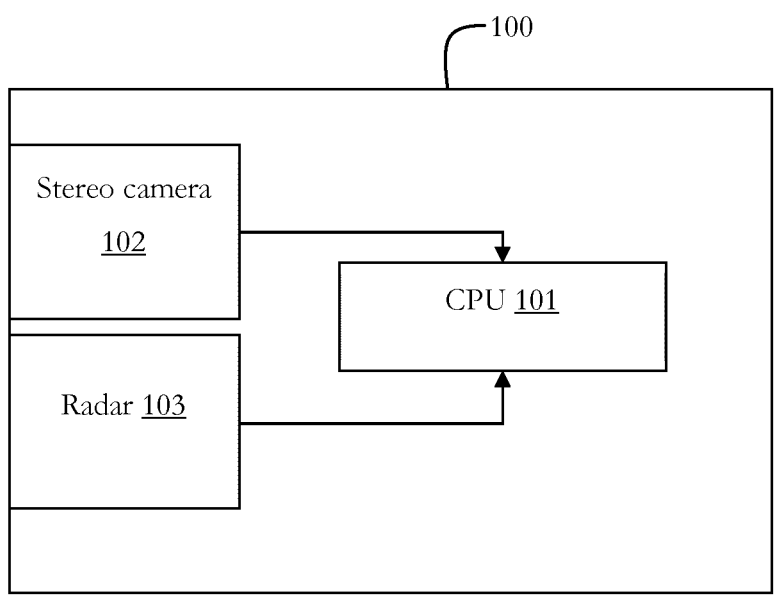
FIG. 10 depicts a block diagram of a vehicle including an object detection circuitry according to the present disclosure.

FIG. 10 depicts a block diagram of a vehicle 100, which includes a CPU 101, which is configured to function as an object detection circuitry according to the present disclosure.

The vehicle 100 further includes a stereo camera 102 for acquiring first sensing data and a radar 103 for acquiring second sensing data, which are fed to the CPU 101, such that first and second feature data are generated.

However, in some embodiments, the first and the second feature data are generated in the first and the second sensor or in specific circuitry for generating the first and/or the second feature data, as discussed herein.

For example, a feature map may be computed in each sensor and may be transferred to a fusion-and-detection unit, which may be configured to fuse the feature maps, determine the probabilities and detect the object.

It should be recognized that the embodiments describe methods with an exemplary ordering of method steps. The specific ordering of method steps is however given for illustrative purposes only and should not be construed as binding. For example the ordering of 91 and 91' in the embodiment of FIG. 9 may be exchanged. Also, the ordering of 711 and 712 in the embodiment of FIG. 7 may be exchanged. Further, also the ordering of 721 and 722 in the embodiment of FIG. 7 may be exchanged. Other changes of the ordering of method steps may be apparent to the skilled person.

In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

It should, moreover, be noted that the present disclosure, although exemplarily described for a detection of cars and an implementation in a vehicle, is not limited to the described embodiments. In particular, the present disclosure may be applied in each case or situation, in which a surrounding scenario can be represented in a two-dimensional coordinate system, e.g. in any land-based or sea-surface based navigation system, such as driver assistance systems in cars, autonomous vehicles, robots, boats, ships, and the like.

Note that the present technology can also be configured as described below.

(1) An object detection circuitry configured to:
obtain first feature data which are based on first sensing data of a first sensor;
compare the first feature data to a first predetermined feature model being representative of a predefined object, wherein the first predetermined feature model is specific for the first sensor, thereby generating first object probability data;
obtain second feature data which are based on second sensing data of a second sensor;
compare the second feature data to a second predetermined feature model being representative of the predefined object, wherein the second predetermined feature model is specific for the second sensor, thereby generating second object probability data; and
combine the first and the second object probability data, thereby generating combined probability data for detecting the predefined object.

(2) The object detection circuitry of (1), further configured to:
detect a plurality of maxima of the combined probability data being indicative for at least one position parameter of the predefined object; and
determine the at least one position parameter of the predefined object.

(3) The object detection circuitry of anyone of (1) or (2), wherein the at least one position parameter includes at least one of a position, a distance, an angle, and a posture.

(4) The object detection circuitry of anyone of (1) to (3), further configured to:
determine at least one of a correctness and a precision of the detection of the predefined object.

(5) The object detection circuitry of anyone of (1) to (4), further configured to:
track the detected predefined object.

(6) The object detection circuitry of anyone of (1) to (5), further configured to:
generate a first feature map based on the first sensing data;
generate a second feature map based on the second sensing data; and
transfer the first and the second feature map into a predefined coordinate system.

(7) The object detection circuitry of anyone of (1) to (6), wherein the first and the second sensor include at least one of a radar sensor, a lidar sensor, a camera, or a time-of-flight sensor.

(8) The object detection circuitry of anyone of (1) to (7), wherein at least one of the first predetermined feature model and the second predetermined feature model is based on a supervised training of an artificial intelligence.

(9) The object detection circuitry of anyone of (1) to (8), wherein the predefined object is based on a class of predefined objects.

(10) The object detection circuitry of anyone of (1) to (9), further configured to:
iteratively convolve the first feature data with the first predetermined feature model, thereby generating the first object probability data;
iteratively convolve the second feature data with the second predetermined feature model, thereby generating the second object probability data; and
iteratively convolve the first and the object probability data, thereby generating the combined object probability data.

(11) An object detection method comprising:
obtaining first feature data which are based on first sensing data of a first sensor;
comparing the first feature data to a first predetermined feature model being representative of a predefined object, wherein the first predetermined feature model is specific for the first sensor, thereby generating first object probability data;
obtaining second feature data which are based on second sensing data of a second sensor;
comparing the second feature data to a second predetermined feature model being representative of the predefined object, wherein the second predetermined feature model is specific for the second sensor, thereby generating second object probability data; and
combining the first and the second object probability data, thereby generating combined probability data for detecting the predefined object.

(12) The object detection method of (11), further comprising:
detecting a plurality of maxima of the combined probability data being indicative for at least one position parameter of the predefined object; and
determining the at least one position parameter of the predefined object.

(13) The object detection method of anyone of (11) and (12), wherein the at least one position parameter includes at least one of a position, a distance, an angle, and a posture.

(14) The object detection method of anyone of (11) to (13), further comprising:
determining at least one of a correctness and a precision of the detection of the predefined object.

(15) The object detection method of anyone of (11) to (14), further comprising:
tracking the detected predefined object.

(16) The object detection method of anyone of (11) to (15), further comprising:
generating a first feature map based on the first sensing data;
generating a second feature map based on the second sensing data; and
transferring the first and the second feature map into a predefined coordinate system.

(17) The object detection method of anyone of (11) to (16), wherein the first and the second sensor include at least one of a radar sensor, a lidar sensor, a camera, or a time-of-flight sensor.

(18) The object detection method of anyone of (11) to (17), wherein at least one of the first predetermined feature model and the second predetermined feature model is based on a supervised training of an artificial intelligence.

(19) The object detection method of anyone of (11) to (18), wherein the predefined object is based on a class of predefined objects.

(20) The object detection method of anyone of (11) to (19), further comprising:
iteratively convolving the first feature data with the first predetermined feature model, thereby generating the first object probability data;
iteratively convolving the second feature data with the second predetermined feature model, thereby generating the second object probability data; and
iteratively convolving the first and the second object probability data, thereby generating the combined probability data.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An object detection circuitry configured to:
obtain first feature data which are based on first sensing data of a first sensor;
compare the first feature data to a first predetermined feature model being representative of a predefined object O thereby generating first object probability data representing a first probability of an existence of the predefined object O in a first object parameter space, wherein the first predetermined feature model represents a plurality of different postures of the predefined object O and is specific for the first sensor;
obtain second feature data which are based on second sensing data of a second sensor;
compare the second feature data to a second predetermined feature model being representative of the predefined object O thereby generating second object probability data representing a second probability of an existence of the predefined object O in a second object parameter space, wherein the second predetermined feature model represents a plurality of different postures of the predefined object O and is specific for the second sensor;
combine the first and the second object probability data, thereby generating combined probability data for detecting the predefined object O; and
detect the predefined object O using the combined probability data.

2. The object detection circuitry of claim 1, further configured to:
detect a plurality of maxima of the combined probability data being indicative for at least one position parameter of the predefined object O; and
determine the at least one position parameter of the predefined object O.

3. The object detection circuitry of claim 2, wherein the at least one position parameter includes at least one of a position, a distance, an angle, or a posture.

4. The object detection circuitry of claim 2, further configured to:
determine at least one of a correctness or a precision of the detection of the predefined object O.

5. The object detection circuitry of claim 2, further configured to:
track the detected predefined object O.

6. The object detection circuitry of claim 1, further configured to:
generate a first feature map based on the first sensing data;
generate a second feature map based on the second sensing data; and
transfer the first and the second feature map into a predefined coordinate system.

7. The object detection circuitry of claim 1, wherein the first and the second sensor include at least one of a radar sensor, a lidar sensor, a camera, or a time-of-flight sensor.

8. The object detection circuitry of claim 1, wherein at least one of the first predetermined feature model or the second predetermined feature model is based on a supervised training of an artificial intelligence.

9. The object detection circuitry of claim 1, wherein the predefined object O is based on a class of predefined objects.

10. The object detection circuitry of claim 1, further configured to:
iteratively convolve the first feature data with the first predetermined feature model, thereby generating the first object probability data;
iteratively convolve the second feature data with the second predetermined feature model, thereby generating the second object probability data; and
iteratively convolve the first and the second object probability data, thereby generating the combined object probability data.

11. An object detection method comprising:
obtaining first feature data which are based on first sensing data of a first sensor;
comparing the first feature data to a first predetermined feature model being representative of a predefined object O thereby generating first object probability data representing a first probability of an existence of the predefined object O in a first object parameter space, wherein the first predetermined feature model represents a plurality of different postures of the predefined object O and is specific for the first sensor;
obtaining second feature data which are based on second sensing data of a second sensor;
comparing the second feature data to a second predetermined feature model being representative of the predefined object O thereby generating second object probability data representing a second probability of an existence of the predefined object O in a second object parameter space, wherein the second predetermined feature model represents a plurality of different postures of the predefined object O and is specific for the second sensor;
combining the first and the second object probability data, thereby generating combined probability data for detecting the predefined object O; and
detecting the predefined object O using the combined probability data.

12. The object detection method of claim 11, further comprising:
detecting a plurality of maxima of the combined probability data being indicative for at least one position parameter of the predefined object O; and
determining the at least one position parameter of the predefined object O.

13. The object detection method of claim 12, wherein the at least one position parameter includes at least one of a position, a distance, an angle, or a posture.

14. The object detection method of claim 12, further comprising:

determining at least one of a correctness or a precision of the detection of the predefined object O.

15. The object detection method of claim 12, further comprising:
tracking the detected predefined object O.

16. The object detection method of claim 11, further comprising:
generating a first feature map based on the first sensing data;
generating a second feature map based on the second sensing data; and
transferring the first and the second feature map into a predefined coordinate system.

17. The object detection method of claim 11, wherein the first and the second sensor include at least one of a radar sensor, a lidar sensor, a camera, or a time-of-flight sensor.

18. The object detection method of claim 11, wherein at least one of the first predetermined feature model or the second predetermined feature model is based on a supervised training of an artificial intelligence.

19. The object detection method of claim 11, wherein the predefined object O is based on a class of predefined objects.

20. The object detection method of claim 11, further comprising:
iteratively convolving the first feature data with the first predetermined feature model, thereby generating the first object probability data;
iteratively convolving the second feature data with the second predetermined feature model, thereby generating the second object probability data; and
iteratively convolving the first and the second object probability data, thereby generating the combined probability data.

* * * * *